… …

United States Patent [19]

Mueller

[11] Patent Number: 5,230,906
[45] Date of Patent: Jul. 27, 1993

[54] METHOD OF AND APPARATUS FOR MANUFACTURING FIBER-REINFORCED PLASTICS ARTICLES

[75] Inventor: Bruno Mueller, Grenchen, Switzerland

[73] Assignee: Polytex Plastic SA, Grenchen, Switzerland

[21] Appl. No.: 700,793

[22] Filed: May 16, 1991

Related U.S. Application Data

[63] Continuation-in-part of Ser. No. 423,573, Oct. 16, 1989, abandoned, which is a continuation of Ser. No. 122,018, Nov. 17, 1987, abandoned.

[30] Foreign Application Priority Data

Nov. 24, 1986 [EP] European Pat. Off. ........ 86810533.9

[51] Int. Cl.$^5$ .................... B29C 51/10; B29C 51/36; B05C 3/12; C23C 14/56

[52] U.S. Cl. ..................................... 425/89; 118/40; 118/45; 118/50; 118/405; 118/419; 118/423; 118/428; 264/134; 264/136; 249/113; 249/135; 425/93; 425/117; 425/384; 425/388; 425/DIG. 119; 156/285

[58] Field of Search ............... 425/111, 122, 115, 117, 425/71, 106, 110, 384, 388, 305.1, 403.1, 89, 93; 264/46.8, 337, 87, 544, 134, 135, 136, 137; 118/404, 50, 405, 419, 423, 424, 426, 428, 40, 45; 156/500, 382, 501, 286, 285; 249/113, 135

[56] References Cited

U.S. PATENT DOCUMENTS

| | | | |
|---|---|---|---|
| 2,120,328 | 6/1938 | Ferngren | 264/554 |
| 2,917,783 | 12/1959 | Olson et al. | 264/547 |
| 3,001,582 | 2/1958 | Kindseth et al. | 249/113 |
| 3,072,964 | 1/1963 | Tilden | 425/273 |
| 3,353,219 | 11/1967 | Snyder | 425/405.1 |
| 3,358,061 | 12/1967 | Gidge | 264/89 |
| 4,172,869 | 10/1979 | Oishi et al. | 264/134 |
| 4,466,845 | 8/1984 | Fortuna | 156/73.5 |
| 4,478,771 | 10/1984 | Schreiber | 264/22 |
| 4,582,665 | 4/1986 | Jabarin | 264/544 |
| 4,614,684 | 9/1986 | Ebneth et al. | 428/252 |
| 4,737,383 | 4/1988 | Matsumae et al. | 118/424 |
| 4,770,832 | 9/1988 | Okamoto et al. | 264/136 |
| 4,781,569 | 11/1988 | Kinugasa et al. | 425/504 |

FOREIGN PATENT DOCUMENTS

| | | | |
|---|---|---|---|
| 0036391 | 10/1981 | European Pat. Off. | |
| 2426717 | 4/1975 | Fed. Rep. of Germany | |
| 3206905 | 10/1983 | Fed. Rep. of Germany | |
| 3419494 | 11/1985 | Fed. Rep. of Germany | |
| 56-38213 | 4/1981 | Japan | |
| 62-39218 | 2/1987 | Japan | |
| 8600045 | 1/1986 | PCT Int'l Appl. | |
| 593751 | 2/1978 | U.S.S.R. | 118/405 |
| 1232488 | 5/1986 | U.S.S.R. | 118/405 |
| 2167340 | 5/1986 | United Kingdom | |

Primary Examiner—Khanh P. Nguyen
Attorney, Agent, or Firm—Marks & Murase

[57] ABSTRACT

An apparatus used in connection with the construction of a duroplastic, fiber-reinforced article a fibrous web which includes continuously impregnating the web under subatmospheric pressure with a liquid, curable resin composition whose viscosity is gradually increasing. The prepreg thus obtained is covered on both its major surfaces by thin polymer sheets, then cut into the desired length, vacuum molded, pre-cured in the mold and finally cured outside the mold. Construction parts, car parts and boat bodies may thus be produced.

17 Claims, 3 Drawing Sheets

METHOD OF AND APPARATUS FOR MANUFACTURING FIBER-REINFORCED PLASTICS ARTICLES

This application is a continuation-in-part of U.S. patent application Ser. No. 07/423,573, METHOD OF SHAPING PLASTICS MATERIALS, MORE ESPECIALLY COMPOUND DUROPLATIC MATERIALS, AND AN APPARATUS FOR IMPLEMENTING THE METHOD, filed Oct. 16, 1989, now abandoned, which is a continuation application of U.S. patent application Ser. No. 07/122,018 having the same title, filed on Nov. 17, 1987, now abandoned.

BACKGROUND OF THE INVENTION

1. Field of the Invention

The present invention relates to a method of manufacturing fiber-reinforced plastics articles, such as construction panels, boat hulls, roof tiles, car body parts, etc; by deep-drawing a planar prepeg comprising fibers impregnated with curable resins; and curing the said resins after deep-drawing of the prepeg. The invention also relates to a method of manufacturing said planar prepegs, and to a mold to be used for said deep-drawing.

2. DESCRIPTION OF THE PRIOR ART

Prepegs consisting of fiber mats which are impregnated by curable resins have been deep-drawn in open contoured mold dies having bore holes, by exerting a subatmospheric pressure, and subsequent UV-light curing, see U.S. Pat. No. 4,478,771 (Schreiber). However, these molds have serious drawbacks since the prepeg is drawn with a relatively great force towards the bore holes but with much weaker forces towards portions remote from those holes. Accordingly, uniform shaping of the web, especially at curved portions of the mold having small radii, will not occur. Vacuum deep-draw molds have also become known. Thus, Japanese patent publication 62-39218 (Kasuga) discloses a vacuum forming mold composed of a mixture of sands and a furan resin. This mold has been designed for the deep-drawing of polypropylene sheets, thus an extensible, thermoplastic material, and it has been found that such molds cannot be used for the deep-drawing of prepregs.

Fiber reinforced prepregs have been prepared by simply soaking of a fiber mat or other fiber arrangement in liquid resins. In order to keep the resin within the fiber mat and prevent it from leaking, the resin must have a relatively high viscosity. However, this very viscosity leads to leaving air bubbles within the mat. This causes a significant loss of strength in the cured prepreg.

SUMMARY OF THE INVENTION

Hence, it is a general object of the present invention to provide a new overall method for the manufacture of fiber-reinforced plastics articles.

Another important object is to provide a new and useful vacuum mold for deep-drawing and curing of the resin impregnated, not yet cured prepeg sheets.

A further object of the invention is to provide a new and useful apparatus or production line for the manufacture of fiber-reinforced plastics articles, both this production line and the aforesaid mold being provided for implementing the also aforesaid overall method. Still further objects of the invention are to provide a continuous method for making an impregnated prepreg ready for vacuum molding, as well as a continuously working apparatus for implementing this method.

In its broadest aspect, the invention provides a method of manufacturing fiber-reinforced, cured plastics articles which can be carried out in a continuous manner and comprising two important inventive steps, namely the continuous production of a curable prepreg free from air voids or inclusions, and its shaping by deep-drawing and its precuring in a new, special vacuum mold. The invention further provides an apparatus for carrying out the first step mentioned above.

The method of the invention comprises impregnating a fibrous web with a curable resin composition whose viscosity is gradually growing, under subatmospheric pressure in a vacuum tower which comprises a liquid resin composition whose level is raised in the tower due to a subatmospheric pressure applied to the interior of the tower. The impregnated fibrous web which has now become a so-called "prepreg" is then covered on both sides with a thin protecting polymer foil. These prepregs, cut to appropriate length, are then deep-drawn in the new vacuum mold where the molding or shaping surfaces are homogeneously provided with vacuum due to a shaping body made up of aluminum beads cemented together by a cured resin in such a manner that this body remains gas permeable.

Still other objects and advantages of the invention will be pointed out specifically or will become apparent from the following description of examples and specific embodiments taken in conjunction with the accompanying drawings.

BRIEF DESCRIPTION OF THE DRAWINGS

FIG. 1 A is a partially shown section in the plane along line A—A in FIG. 1;

DESCRIPTION OF PREFERRED EMBODIMENTS

Figures 1, 1A:
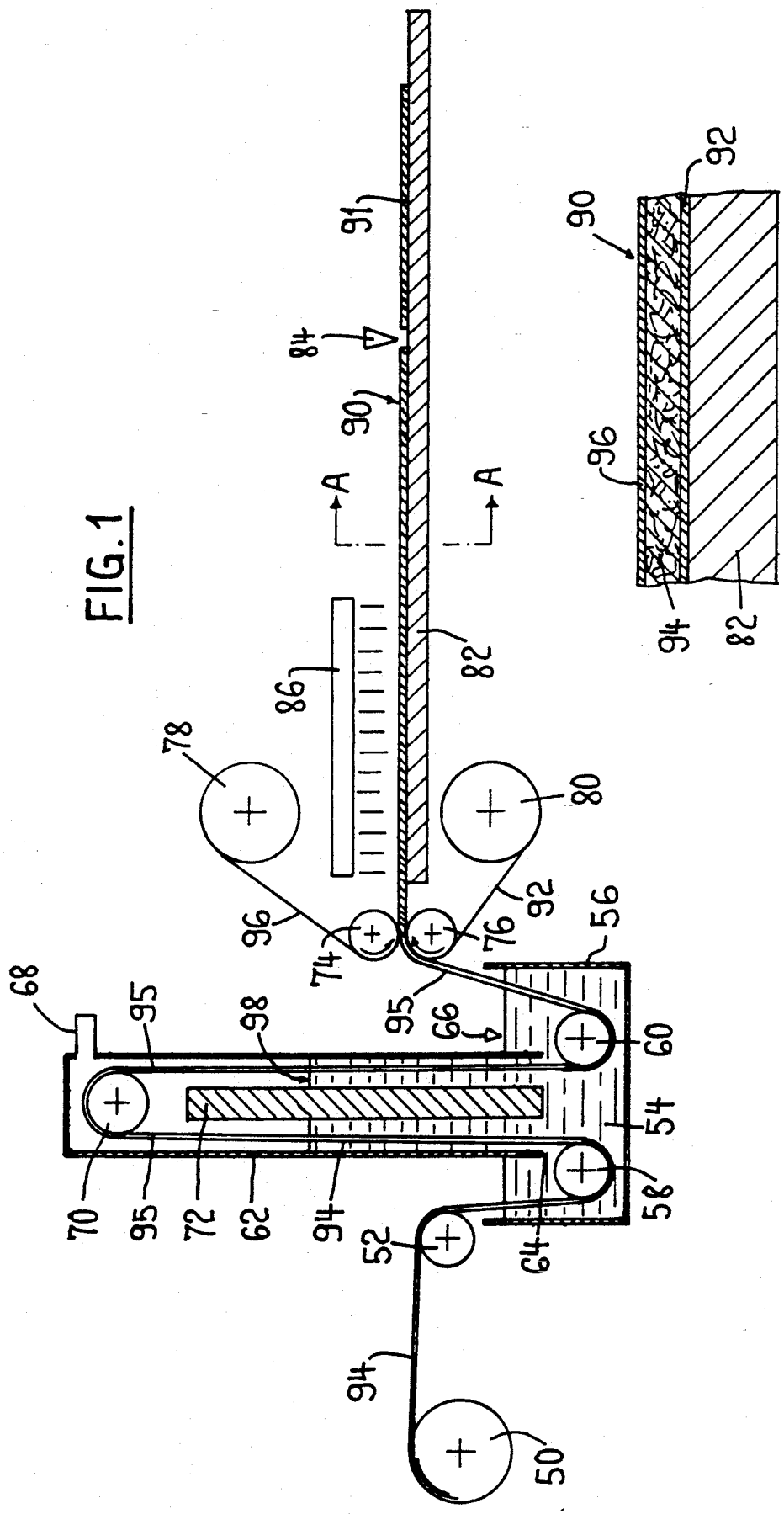
FIG. 1 is a schematic side view illustrating an apparatus for the manufacture of prepregs from which also the process steps will become apparent.

In the past, curable prepregs have generally been manufactured by soaking within a trough a fibrous mat, vleece or other analoguous material in a liquid curable resin composition, then, removing the resin impregnated material from said trough, and covering it at least on one of its two faces by a plastic sheet. This method is cumbersome, long-lasting and inaccurate. According to U.S. Pat. No. 4,478,771, already mentioned above, a prepreg is manufactured from a homogeneous fill of 450 g/m$^2$ glass fibers and by an impregnation with 1'340 g/m$^2$ of styrene containing unsaturated polyester resin between two thin soft-polyethylene or polyvinylidene chloride foils As a viscosity increase agent, 2.6% of powdery cellulose aceto=butyrate is dissolved in the resin-styrene mixture, and the original viscosity thereof, namely 6 poise (=0,6 Pa s) is raised to 100 poise (=10 Pa s), see Example 1 of the said patent.

However, it has now been found that the soaking of the fibrous material in the high viscosity resin composition leaves an appreciable amount of air bubbles within the fibrous material due to the high viscosity of the resin composition. This leads to serious losses in the strength and resistance to fracture of the cured plastics articles. Furthermore, the known method is not a continuous one, said soaking taking a rather long time, and the viscosity enhancer used in the prior art is also detrimental to final strength values since it is not compatible with the cured resin composition.

In contrast thereto, the method of the invention does not show these draw-backs. During the soaking step, the viscosity of the resin composition is kept to a relatively low value, and during the molding step, the viscosity of the resin composition enclosed within the prepreg forming fibrous material has raised to a high value. This important feature is achieved, according to the invention, by incorporating into the starting resin composition a reactive viscosity enhancer capable of gradually raising the viscosity of the mixture. Furthermore, the soaking step is carried out at subatmospheric pressure in order to remove air from the fibrous material as completely as possible. The soaking may further be enhanced, if necessary in special cases, by incorporating a fiber wetting agent into the resin composition.

The fibrous material may be chosen at will. The fibers may be of organic or inorganic origin; examples thereof are cotton, wool, polyester, polyurethane, polyamide, polyolefin, acrylic materials, glass, asbestos, carbon. Glass fibers, alone or in mixture with polyester fibers, are presently preferred. The fibers are used in the form of mattings, vleeces or fabrics; at present, roving fabrics or roving layer stratums, layered at 45° to the travelling direction and stitched together, being preferred. These stratums are known and commercially sold.

The curable resin composition to be used for making the prepreg of this invention comprises any curable resin, e.g. based on epoxy, urethane or ester resins and furthermore a monomeric crosslinking agent such as styrene and its derivatives or any other vinyl compound or olefin derivatives. A mixture of an unsaturated polyester and styrene is preferred. This composition may be cured by heat, radiation such as UV, or according to radical copolymerization. Depending upon the curing method to be selected, appropriate initiators or initiator systems may be added, e.g. UV sensitizers, cobalt or manganese salts, peroxy compounds etc. The impregnating, curable resin as well as the curing promoters to be added are well known to the men skilled in the art and need not be described in detail here.

The viscosity enhancer with retarded activity which is preferably used according to the invention, in the case of a polyester-styrene basic composition, is ultrafinely divided active magnesium oxide, magnesium hydroxide or a mixture thereof. For example, if about 1% by weight of this magnesium preparation is added to said resin composition having an original viscosity of about 1 Pa.s at 20° C., the viscosity after 3 hours is about 10 Pa.s and after 5 hours about 1'000 Pa.s. Furthermore, said MgO or Mg(OH)$_2$ is well compatible with the resin composition before and after curing.

Thus, the present invention, in one of its particular aspects, provides a sophisticated method of manufacturing a curable prepreg, and the inventive idea is to impregnate a fibrous, web-like material with a relatively low viscous curable resin composition. The impregnation is easy, complete end quick and is enhanced by the application of subatmospheric pressure In a subsequent step, the impregnated web is processed for shaping as will be described below. During this processing step, the viscosity of the curable resin composition has acquired a ten to thousand fold value compared to the initial viscosity so that there will virtually no leakage of the resin from the prepreg. Viscosity itself as well as the speed of viscosity increase may be controlled; thus, a lower initial viscosity may be obtained by the addition of more styrene to the resin composition and/or by the application of heat, and the increase of viscosity may be speeded up by heating the resin or the impregnated prepreg.

FIG. 1 shows schematically an apparatus for the manufacture of the prepreg of this invention. In a known manner, such prepregs are enclosed between two thin sheets of plastic which is inert to resin, styrene and the additives of the resin composition.

Supply rolls or supply unit 50 contain windings of the starting fibrous material web 94. Although any fibrous web may be used, this material 94 will be designed herein as "roving stratus" according to a preferred embodiment. This roving stratus has a thickness of about 2 to 5 mm and may have a web width of up to 2 meters. If the final cured article should have a greater thickness than that of one web, more than one supply roll 50 can be provided, and two or more stratus webs are then combined on deflection roller 52.

The liquid resin composition 54 is contained in a trough 56. Two deflection rollers 58, 60 are horizontally mounted within the trough 56. An impregnating tower 62 having an inversed U-shaped cross section is fixed in such a manner within and above trough 56 that the rim 64 of the inversed U opening is beneath the level 66 of the liquid resin composition 54. At the top of the tower 62, a vacuum connection tube 68 is provided, and a freely running or driven deflection roller 70 is mounted within the top portion of the tower 62. A displacement body 72 my be provided in the axial middle section of the tower 62.

A pair of parallel, cooperating, positively driven compression rollers 74, 76 are mounted outside the tower 62 and trough 56. In the space above roller 74, a supply roll 78 for a thin polyvinylalcohol (PVA) foil 96 is provided, and in the space below roller 76, another supply roll 80 for PVA foil 92 is provided. A supporting table 82 is horizontally mounted in front of the roller nip between the compression rollers 74, 76. At an appropriate distance from those compression rollers, a cutter knife 84, having about the width of table 82, is shown to hung over the table 82. Furthermore, a transverse heating source 86 may be mounted above the front portion of table 82.

The apparatus shown in FIG. 1 is operated as follows; features and details of the method according to the invention will become apparent from the following description.

First of all, roving stratus web 94 is drawn from the supply roll 50, passed around deflection rollers 52, 58, 70, 60 in the manner shown in FIG. 1, then between compression rollers 74, 76 whose nip is opened for this purpose. PVA foil 96 is unwound from supply roll 78 and placed around compression roller 74 upon stratus web 94. PVA foil 92 is unwound from supply roll 80 and placed around compression roller 76 under stratus web 94. Thus, a sandwich 90 is formed comprising basic PVA sheet or foil 92, roving stratus web 94 and overlying PVA sheet 96, see FIG. 1A.

Then, liquid curable resin composition 54 is poured into trough 56. A subatmospheric pressure is established within tower 62 by applying it to the connection tube 68. Thus, if this vacuum is correctly selected, the level of the liquid resin in trough 56 will raise in the interior of tower 62 to a certain height and form a higher level, about at 98. Displacement body 72 (an optional part of the apparatus) serves to limit the amount of resin within tower 62.

Now, a driving force is applied to compression rollers 74 and 76 whose nip has meanwhile be adjusted to the value of about the desired thickness of the prepreg 90. The rotation of rollers 74 and 76 (see arrows) draws the two foils 96 and 92 and the intermediate roving stratus web 94 from the corresponding supply rolls 78, 80 and 50, respectively, and supplies the prepreg 80 over the table 82 where it may be cut by the knife 84 into appropriate lengths 91.

The impregnation within trough 56 and tower 62 will occur as follows. First, the roving web 94 enters the trough 56 downstream of roller 52 and upstream of roller 58. It receives a first impregnation with resin 54 by a merely soaking phenomenon. Then, the web 94 travels upwardly in direction of deflection roller 70. When the web 94 leaves the resin level at 98, the subatmospheric pressure or vacuum within the upper part of the tower 62 removes virtually all air bubbles and other air pockets from the pre-impregnated roving web (see FIG. 1). After having been turned by 180° on the deflecting roller 70, the web 95 travels downwardly and re-enters the liquid resin composition at 98. During its travel across the resin toward deflection roller 60 and still afterwards, the hollow, airless spaces in web 95 are now completely filled by the liquid resin. The web is deflected by roller 60 and finally leaves the resin bath in a fully impregnated state.

Just before entering the roller nip between compression rollers 74 and 76, the underside of web 95 is covered by the PVA sheet 92 unwound from supply roll 80, and the upper side is covered by the PVA sheet 96 unwound from supply roll 78. Thus, compression rollers 74, 76 will not come into direct contact with the resin impregnated web 95. The nip between rollers 74, 76 is controlled to a value corresponding to the desired final thickness of the prepreg 90.

Since the viscosity of the impregnating resin increases with time, the prepreg 90 thus obtained will not substantially leak and loose resin. In order to rapidly increase resin viscosity before cutting the continuous prepreg 90 by knife 84 in appropriate lengths 91, a heating device 86 may be proved to accelerate the speed of viscosity increase.

The prepreg pieces 91 are now ready for shaping and curing into the final articles. It should be noted that the viscosity increasing additive will raise the viscosity of the resin finally to about 1,000 fold its original value, and the final viscosity, attained after about 5 hours, will not increase further nor will the very curing of the resin take place. Prepreg pieces 91 may thus be kept even several days before shaping and curing.

FIG. 2 to 5 illustrate a mold of the invention. This mold, generally designed as 1, comprises an edge 2 and a mold interior 3. Generally, the base 23 of the mold interior is not level and is adapted to the shape of the article to be manufactured. As can be seen from FIG. 3 and 4, the lower mold portion 1 is made from a porous material 5 whose manufacture is another aspect of this invention and will be described in detail later. This porous material is formed from aluminum beads 6, especially spheric ones (FIG. 5) which are cemented together by a resin layer 7 in such a manner that the whole body 5 still has a substantial porosity and is air permeable. The aluminum spheres may have diameters comprised between 0.1 and 4 mm or even more.

According to the invention, the size of the aluminum spheres or beads may be different in the mold. Thus, the main body of mold 1 may be filled with coarse beads (of course always bound together by a resin) 5A, etc. The average diameter of the beads decreases layerwise toward the inner surface 23. The fineness of the uppermost bead layer (e.g. 5C in FIG. 4) is selected in function of the desired surface quality or finish of the article to be shaped. Thus, if a high surface quality is desired, layer 5C should comprise the finest aluminum beads, e.g. from 0.1 to 0.5 mm. To the contrary, if no special finish of the article to be manufactured is desired, layer 5C and, optionally, also layer 5B may be omitted.

Only the shaping surfaces 23, 24 of the mold are air permeable, i.e. aluminum bead layer 5C is uncovered. All other surfaces of the mold are covered by an airtight housing or casing 15 which thus envelops the entire lower mold portion 1 with the exception of the mold interior 3. Conduit 10 is made of a different material from aluminum, and air permeable cover 11 takes up thermal dilation differences between the aluminum granules or beads and conduit 10. The lower mold portion 1 contains an annular, circumferential conduit 10, generally arranged parallel to the outer contours of the mold, see FIG. 2 where it is schematically represented by a dashed line. A connection 8 connects conduit 10 to the exterior of the mold and serves to connect conduit 10 to a vacuum source (not shown). Another connection 9 of the conduit 10 serves to connect the latter to a compressed air source (not shown). Conduit 10, which contributes to the mechanical stability of the mold, is a metal pipe, generally of steel, of any desired cross sectional shape and size. Conduit 10 has a plurality of apertures or borings 19 directed to the mold interior. Conduit 10 is thermally insulated against aluminum bead layer 5A by an air permeable cover 11, preferably a fiber mat. The mold further comprises a cover 12 (FIG. 3) which may be a plain panel or simply a frame whose shape and size is adapted to those of the mold. A circumferential holding ring 13 is fixed to the underside of cover 12 in such a manner that it will come to rest on those upper surface portions of lower mold portion 1 which are covered by the casing 15.

The mold is manufactured according to this invention in the following manner.

First, an appropriate casing 15 is provided and then equipped with the annular conduit 10. This conduit 10 (which is fixed within the casing 15 merely by the connection studs 8 and 9) is then enveloped by the isolation mat 11.

The cross-sectional shape as well as the material of the conduit 10 are selected such as to stiffen the mold and to increase its stability. Since normally a steel pipe is used for the conduit 10, the isolation 11 is necessary to take up the differences in the thermal expansion coefficients of iron and aluminum. The thickness of the isolation mat 11 is about 3 to 5 mm.

Then, a blend is made from aluminum beads and a binder resin. This resin is a special, cold hardening, heat resistant polyester resin, normally designed for the use in polymer concrete, and which should be thixotropic such as to cement the aluminum beads together but not subject to the formation of drops which could obliterate the porous layer or layers 5.

An important feature of this invention is the choice of the correct ratio of aluminum beads to the binder resin since this ratio will determine the strength and mechanical resistance of the mold, on one hand, and its porosity to air on the other hand. If too much of the resin is used, the mold is mechanically very resistant but perhaps not sufficiently air permeable. To the contrary, if too resin is used, air permeation will be excellent but mechanical resistance too poor. Furthermore, said inventive ratio will depend upon the size of the aluminum beads.

Now, the inventor has found that this ratio of aluminum beads to resin, expressed by weight, should be selected in the ranges according to the following table:

| Weight ratio ranges of aluminum to resin | | | | |
|---|---|---|---|---|
| aluminum beads | | resin weight | | Preferred weight |
| diameter (mm) | weight (g) | general (g) | preferred (g) | ratio aluminum/resin |
| 0.1–0.5 | 100 | 30–60 | 50 | 1:0.5 |
| 0.6–1.5 | 100 | 20–50 | 30 | 1:0.3 |
| 1.5–3 | 100 | 15–30 | 20 | 1:0.2 |
| 3–4 | 100 | 10–25 | 15 | 1:0.15 |

The blend made up of aluminum beads and binder resin is then poured into the casing 15 and distributed therein according to the shape of the cured prepreg article to be formed. A totally exact shaping is not necessary since the mold may be brought in shape after the curing of the binder resin by machining, grinding or other well known suitable techniques. This is an important advantage of the invention.

Figure 2:
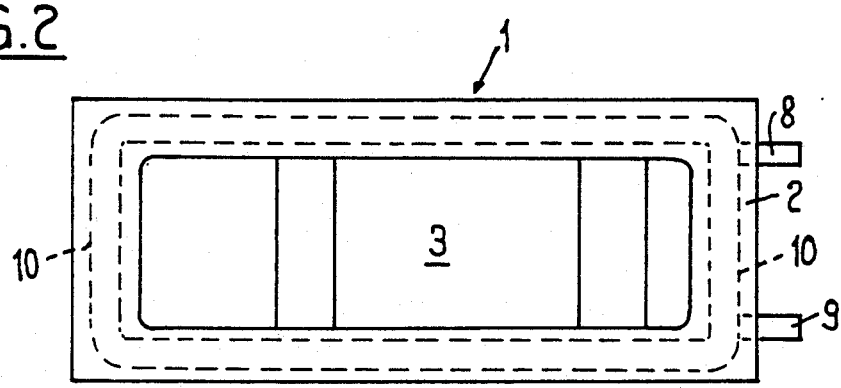
FIG. 2 shows a top view of a vacuum mold for shaping prepregs into finished, cured plastics articles.
Figure 3:
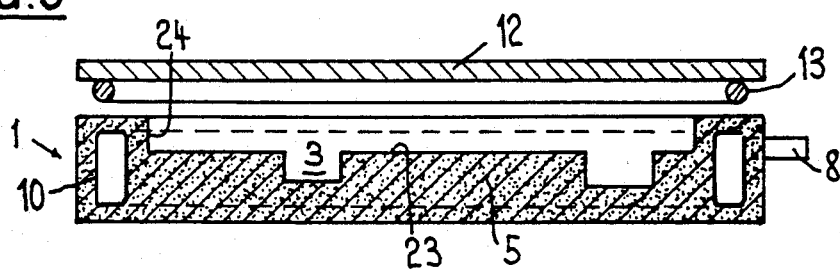
FIG. 3 is a longitudinal sectional view of FIG. 2.
Figure 4:
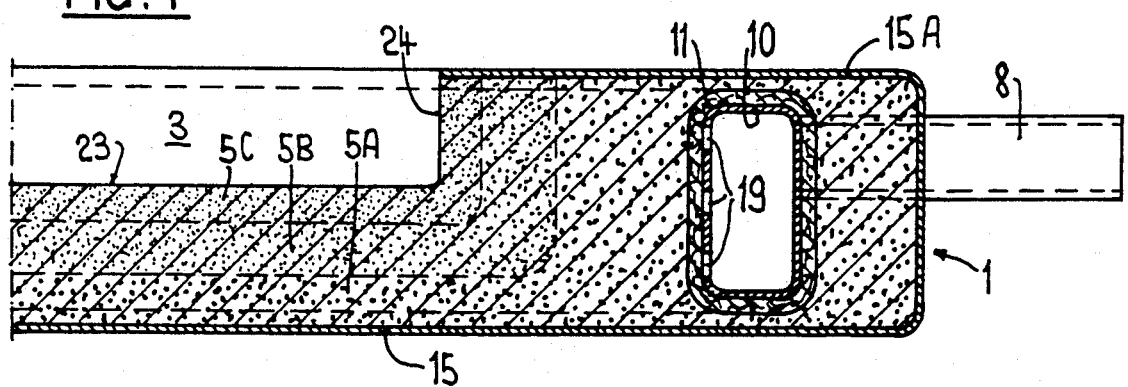
FIG. 4 is an enlarged view of the right-hand lower portion of FIG. 3.
Figure 5:
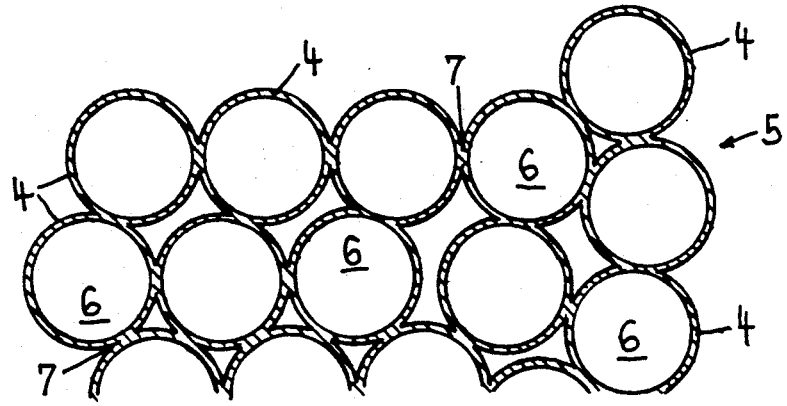
FIG. 5 is a schematical sectional view, on an enlarged scale, of the inner construction of the mold shown in FIG. 2 to 4.

When the said blend is distributed in the casing 15, the mold is put aside for the curing of the resin which will be accomplished after some hours. Finally, a mold is obtained as shown in FIG. 2 to 4. FIG. 5 shows an enlarged portion of the structure of the mold. Aluminum beads 6 are evenly covered by a resin layer 4. At the contact sites of the beads, resin binding locations 7 assure a solid cementing of adjacent beads.

When the mold is to contain different sizes of aluminum beads, it will be manufactured by a stepwise method. First, the undermost layer 5A comprising relatively coarse aluminum beads (see FIG. 4) is produced as described above. When this layer is at least partially cured, a second layer 5B of medium size aluminum beads is introduced into casing 15 over the surface of the layer 5A, and afterwards, if necessary, a layer 5C of the finest beads. Layer 5B may also be omitted. Finally, interior 3 of the mold (surfaces 23,24) is given the desired shape by machining. The mold is now ready for use.

Figure 6:
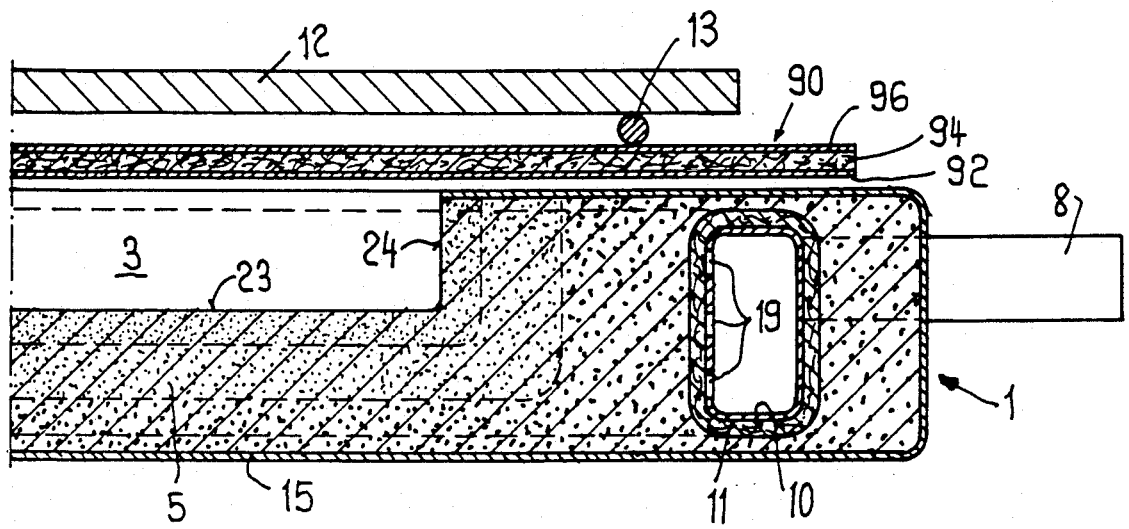
FIG. 6 illustrates a first step of the shaping method of the prepreg.
Figure 7:
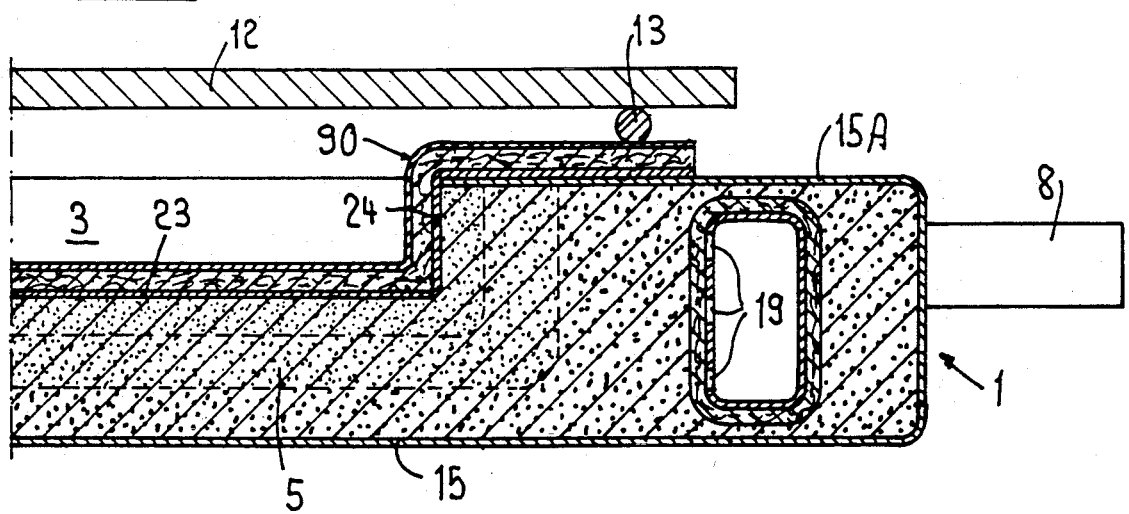
FIG. 7 illustrates another step of the shaping method of the prepreg.

Referring now to FIG. 6 and 7, two steps of the manufacturing method of shaped articles are illustrated. For the details of the mold, see FIG. 2 to 5.

The mold 1 is put horizontally, and a prepreg 90, having been prepared as described above, is laid with its lower surface (polymeric film layer 92) on the upper surface 15A of the casing 15. This step is shown in FIG. 6. In order to obtain air tightness between prepreg 90 and upper mold surface 15A, the cover 12 is laid upon the upper polymeric foil 96 of the prepreg in such a manner that the holding ring 13, which may be made of a resilient material having, however, a smooth and non-frictional surface, slightly presses the prepreg 90 on the upper mold surface 15A, just by the weight of the cover 12. If this weight is not sufficient to assure air-tightness between surfaces 15A and 92, the load of the cover 12 may be increased by conventional means.

Now, the connection tube 8 is connected to a vacuum source (not shown), and vacuum is applied to the mold space 3. The air in space 3 passes by the voids between the aluminum beads 6 (FIG. 5) through the porous mold material 5, then through the porous isolation layer 11 of the conduit 10, the holes 19 of the conduit 10, and finally through conduit 10 and connection tube 8. As a result of the suction and the fact that the prepreg 90 lies in an air-tight condition on the upper, non-porous mold surface 15A, the prepreg is drawn by the vacuum into the mold interior 3 and is finally pressed by the surrounding atmosphere into intimate contact with the inner molding surfaces 23, 24, see FIG. 7. The prepreg molds in a smooth and homogeneous manner to all contours and all surfaces of the porous portion of the mold 1; this perfect molding would not take place if there were only some or even a plurality of holes in an otherwise air-tight molding surface.

The fact that the circumferential holding ring 13 only guarantees airtightness between the prepreg 90 and the upper airtight mold surface 15A but does not prevent a horizontal relative movement of prepreg and mold surface, all the more that ring 13 has a smooth surface, in other words that ring 13 is no clamping ring, allows the prepreg 90 to slide during vacuum molding over the mold surface 15A to cope for the length demand during molding. This condition can be seen by comparing FIG. 6 and 7.

After the molding step, the prepreg can be cured. Preferably, curing is accomplished during the vacuum is still applied to the mold. Cover 12 can be remain on the mold if that cover is a frame; normally, it will be removed. Curing is initiated by application of energy such as hot air, ultraviolet light, electron beams, infrared light, etc. to the molded prepreg from above.

The prepreg 90 may gently be warmed before vacuum molding if it is too stiff. This warming can be performed by any one of the energy sources just described. After curing, the vacuum is removed from connection tube 8, air is allowed to fill the mold body, and the prepreg may be removed from the mold. In principle, it can be removed even in a pre-cured state, and final curing may be effected outside the mold. Molded prepreg removal may be assisted by blowing compressed air into the mold body through connection tube 8 or 9. After complete curing, polymeric foils 92 and 96 may be peeled from the cured prepreg 94.

It is important for the invention that aluminum is used for the body 5 of the mold. In fact, there is a problem associated with thermal expansion of the mold and the prepreg to be formed.

As it has already been mentioned above, the curing of the prepreg is normally accomplished by the application of thermal energy or such an energy which is transformed into heat within the prepreg. If the mold has another thermal expansion coefficient than the prepreg, the shaped and cured article would have other dimensions than those of the mold after cooling. This effect is well known to the man skilled in the art, and until now, complicated calculations had to be made in order to give the cold mold dimensions which differ from those of the article, and these calculations are necessarily only approximate since the real temperature of curing may change from one curing to another.

Thus, it has been found that a mold material should be used which allows to manufacture the mold with exactly the same dimensions as those of the finally cured plastics article; it has further been found that this condition can be fulfilled if the material of the mold has the same thermal expansion properties than those of the prepreg.

The following is a list of thermal expansion coefficients, the unity being 1/K (or 1/° C.):

| | |
|---|---|
| prepreg, vleece, mat | $28 \times 10^{-6}$*) |
| prepreg, vleece mat, insoluble binder | $25 \times 10^{-6}$*) |
| prepreg, roving mat | $15-20 \times 10^{-6}$*) |
| aluminum | $20-24 \times 10^{-6}$ (alloys included) |

*)source: BASF Kunststoffe, prospectus "Palatal A410" August 1978

For comparison, the thermal expansion coefficients of other materials are given below:

| | |
|---|---|
| steel | $12 \times 10^{-6}$ |
| sand | $0.5-1 \times 10^{-6}$ (estimated form quartz) |
| copper | $17 \times 10^{-6}$ |
| magnesium | $26 \times 10^{-6}$ |
| silver | $20 \times 10^{-6}$ |

Thus, only magnesium, silver or a copper alloy could replace the aluminum according to the invention. Of course, aluminum is the optimum since copper and silver are too heavy and magnesium too sensitive to oxidation. Sand and steel, normal mold materials, cannot be used.

The method of the invention will further be illustrated by a working example which is an illustration only and will not limit the invention thereto.

EXAMPLE

To 100 kg of "Palatal A410", a styrene containing, medium reactive isophthalic acid polyester resin, supplied by BASF, Ludwigshafen, Germany, 500 g of "Luvatol" were added and thoroughly dispersed in the resin. Luvatol is a 50% by weight paste of reactive $MgO/Mg(OH)_2$ having a solids fineness below 30 μm and a viscosity of 8 to 12 Pa.s at 20° C. The resin "Palatal A410" has a starting viscosity of $1.35 \pm 0.15$ Pa.s at 20° C., and the styrene content is $43 \pm 2\%$ by weight. Furthermore, a UV sensitizer is added to the resin. A glass roving web in the form of a stratum comprising four mat layers each arranged at 45° C. to the other and stitched together, the width of the web being 1 m, is fed into the apparatus shown in FIG. 1. The resin mixture is poured into the trough 56 and subatmospheric pressure (about 0.2 bar) is applied to tube 68 so that the resin mounts by about 2 m within the tower 62. A polyvinylalcohol foil having a width of about 1.2 m and a thickness of about 0.15 to 0.2 mm is unwound from supply rolls 78 and 80 and combined with the stratum 95 between rollers 74 and 76 as already described above.

The "sandwich" made up of stratum 95 and foils 92 and 96 is now advanced with a speed of about 3 m/min. When the leading end of resin impregnated stratum 94 has reached the knife 84, the unimpregnated length is cut off, and further pieces of about 2 m each are cut off during the containing advance of the web 90.

The inner stratum 94 of the web 90 is impregnated without visible air inclusions at a rate of about 40 to 50% by weight of resin. Its viscosity is found to be about 15 Pa.s and it does not leak from the stratum 94.

Manufacture of a shaped article

One of the prepregs described above is laid on the upper surface of the mold in the manner shown in FIG. 6. The cover 12 is laid upon the prepreg 90 after warming up the prepreg by an infrared radiator from above (not shown) to about 50° C.

Then, as it has already been described in detail above, the prepreg is shaped within the mold. The applied vacuum was about 0.2 bar (0.8 bar subatmosperic). The cover 12 is removed, and a pre-curing is effected by overhead irradiation wish an UV lamp array (not shown) supplying an UV rays power of about 2'000 W/cm$^2$ during 15 to 20 seconds.

The precured prepreg is removed from the mold by cutting the vacuum and introducing a superatmospheric pressure of about 2.5 bar through tube 9. The shaped and precured prepreg is lifted, seized and put aside. After passing a conventional hardening tunnel under continued UV radiation, the plastic foils 92 and 96 are peeled off, and the cured article is cut into size. In this way, construction elements are obtained.

The fact that curing is divided into pre-curing and final hardening is due to the phenomenon of exothermic reaction. If a total curing would be effected under the conditions described for pre-curing, the reaction heat thus produced would weaken or even destroy the prepreg and also affect the mold.

In this Example, about 60 to 70 shaped articles could be produced per hour at reasonable, low cost. All articles had the same mechanical properties, and the dimension tolerances were lower than 0.2%. These features could not be obtained by known methods with analoguous prepregs and other molds.

Whereas the manufacturing process has been described in the Example as a continuous one, the man skilled in the art will be aware that step 2 may be executed in a discontinuous manner.

While the invention has been disclosed in relation to preferred or special embodiments thereof, it will become apparent to those skilled in the art that numerous modifications and variations can be made within the scope and spirit of the invention as claimed in the claims.

I claim:

1. An apparatus for manufacturing fiber-reinforced articles comprising:
    at least one supplying unit containing a fibrous web having an upper and lower surface,
    a trough positioned adjacent to said supply unit which receives said web from said supply unit, said trough containing a liquified curable resin composition for impregnating said web and a means for manipulating said web,
    an impregnating tower positioned in said trough having an open lower end and a closed upper end, said tower including in said upper end a means for connecting said tower to a vacuum source so as to introduce a vacuum to said upper end thereby raising said liquified curable resin composition into said tower from said lower end and extracting air pockets from said web, said tower also containing in said upper end a means for continuously passing said web first substantially vertically upwards from said trough and then substantially vertically downwards into said trough, two supply rolls containing polymer foil positioned adjacent to said trough, means for covering said web which receives said polymer foil from said supply rolls and which covers said web once it has passed through said trough on both of its surfaces with said polymer foil so as to form a covered prepeg, said means for covering positioned adjacent to said trough, means for cutting said prepeg into desired lengths, positioned adjacent to said means for covering which receives said prepeg from said means for covering and cuts said prepeg into desired lengths, and means for vacuum molding and curing said cut prepeg lengths to obtain the desired shaped and cured article, positioned adjacent to said means for cutting.

2. An apparatus for manufacturing a prepeg comprising:

at least one supply unit containing a fibrous web having an upper and lower surface, a trough positioned adjacent to said supply unit which receives said web from said supply unit, said trough containing a liquified curable resin composition for impregnating said web and a means for manipulating said web, an impregnating tower positioned in said trough having an open lower end and a closed upper end, said tower including in said upper end a means for connecting said tower to a vacuum source so as to introduce a vacuum to said upper end thereby raising said liquified curable resin composition into said tower from said lower end and extracting air pockets from said web, said tower also containing in said upper end a means for continuously passing said web first substantially vertically upwards from said trough and then substantially vertically downwards into said trough, two supply rolls containing polymer foil positioned adjacent to said trough, means for covering said web which receives said polymer foil from said supply rolls and which covers said web once it has passed through said trough on both of its surfaces with said polymer foil so as to form a covered prepeg, said means for covering positioned adjacent to said trough, and means for cutting said prepeg into desired lengths, positioned adjacent to said means for covering which receives said prepeg from said means for covering and cuts said prepeg into desired lengths.

3. An apparatus according to claims 1 or 2, wherein said at least one supply unit is adapted to contain a web having a thickness of about 2 mm to 5 mm.

4. An apparatus according to claims 1 or 2, wherein said at least one supply unit is adapted to contain a web having a width of up to about 2 meters.

5. An apparatus according to claim 1 or 2, wherein said impregnating tower has an inverted U-shaped cross-section and a rim at said lower end.

6. An apparatus according to claim 5, wherein said impregnating tower is within said trough so that said rim of said inverted U-shaped opening is within said liquid resin curable composition in said trough.

7. An apparatus according to claims 1 or 2, wherein said means for continuously passing said web further comprises a deflection roller in said upper end of said tower around which said web passes from said upward direction to said downward direction.

8. An apparatus according to claims 1 or 2, wherein said tower contains a displacement body to limit the amount of resin within said tower.

9. An apparatus according to claims 1 or 2, wherein said means for manipulating said web comprises at least two deflection rollers which are horizontally mounted within said trough and below said tower and positioned so that said web may pass into and out of said tower vertically.

10. An apparatus according to claims 1 or 2, wherein said means for covering further comprises a pair of parallel, cooperating, positively driven compression rollers mounted outside said trough and on opposite surfaces of said web which receive foil from said supply rolls and compress said foil on opposite surfaces of said web.

11. An apparatus for manufacturing fiber-reinforced articles as in claim 1, wherein said means for vacuum molding and curing further comprises:

an air-tight casing having a lower surface, lateral surfaces and an upper surface with a central opening;

a porous main body located within said air-tight casing comprising aluminum granules held together by a cured resin;

an internal annular gas permeable conduit within said porous main body located beneath said upper surface of said air-tight casing;

a means for connecting said conduit to a vacuum source, extending from said conduit through said air-tight casing to permit vacuum molding of a prepeg; and a generally flat upper mold portion having at its lower surface a circumferential holding ring having a smooth, non-frictional surface which holds said prepeg on said upper surface of said air-tight casing when vacuum molding of said prepeg occurs.

12. An apparatus for manufacturing fiber-reinforced articles as in claim 11, wherein said aluminum granules have diameters from about 0.1 mm to 4 mm, and weight ratios of aluminum granules to binder resin have values of about 1:0.5 to 1:0.15.

13. An apparatus for manufacturing fiber-reinforced articles as in claim 11, further comprising a means for connecting said conduit to a compressed air source, extending from said conduit through said air-tight casing to permit molding of said prepeg.

14. An apparatus for manufacturing fiber-reinforced articles as in claim 11, further comprising a heat source disposed above said upper mold portion for heating said prepeg while said prepeg is on said upper surface of said air-tight casing and held in place by said holding ring.

15. An apparatus for manufacturing fiber-reinforced articles as in claim 11, wherein said porous main body comprises a lower layer and upper layer of aluminum granules, the aluminum granules of the lower layer being larger in size than said aluminum granules of the upper layer.

16. An apparatus for manufacturing fiber-reinforced articles as in claim 11, wherein said porous main body comprises a lower, an intermediate and a top layer of aluminum granules, said aluminum granules of the lower layer being larger in size than said granules of the intermediate and top layers, and said aluminum granules of the upper layer being smaller in size than said granules of the intermediate and lower layers.

17. An apparatus for manufacturing fiber-reinforced articles as in claim 11, wherein said conduit and said porous main body are made of different materials and said conduit is thermally insulated against said porous main body by a gas-permeable insulating layer which surrounds said conduit.

* * * * *